(12) United States Patent
Yu et al.

(10) Patent No.: US 7,164,106 B2
(45) Date of Patent: Jan. 16, 2007

(54) TOASTER-CUM-MICROWAVE OVEN HAVING A HUMIDITY MEASURING DEVICE

(75) Inventors: Hak Seok Yu, Seoul (KR); Seung Hoe Kim, Seoul (KR)

(73) Assignee: Daewoo Electronics Corporation (KR)

( * ) Notice: Subject to any disclaimer, the term of this patent is extended or adjusted under 35 U.S.C. 154(b) by 0 days.

(21) Appl. No.: 11/272,670

(22) Filed: Nov. 15, 2005

(65) Prior Publication Data

US 2006/0065129 A1 Mar. 30, 2006

Related U.S. Application Data

(62) Division of application No. 10/876,454, filed on Jun. 28, 2004, now abandoned.

(30) Foreign Application Priority Data

Jun. 30, 2003 (KR) ............ 20-2003-0020731
Oct. 14, 2003 (KR) ............ 10-2003-0071246

(51) Int. Cl.
*H05B 6/68* (2006.01)
*A47J 37/08* (2006.01)
*F27D 11/00* (2006.01)

(52) U.S. Cl. ............ 219/685; 219/707; 219/705; 99/385; 99/451

(58) Field of Classification Search ............ 219/685, 219/680, 756, 762, 763, 702, 707, 705, 719, 219/386, 413, 506, 521, 679, 720; 99/385, 99/325, 327, 399, 391–393, 451, DIG. 14
See application file for complete search history.

(56) References Cited

U.S. PATENT DOCUMENTS

| 5,692,432 | A | 12/1997 | Hazan et al. |
| 5,802,957 | A | 9/1998 | Wanat et al. |
| 6,123,012 | A | 9/2000 | Hardin et al. |
| 6,539,840 | B1 | 4/2003 | Choi et al. |
| 2004/0040953 | A1 | 3/2004 | Lee et al. |

FOREIGN PATENT DOCUMENTS

| EP | 1 213 948 A2 | 6/2002 |
| GB | 1 588 795 | 4/1981 |
| JP | 8-24144 | * 1/1996 |

OTHER PUBLICATIONS

Patent Abstracts of Japan, Publication No. 03271630, A. Tsutomu, Mar. 1991.

* cited by examiner

*Primary Examiner*—Philip H. Leung
(74) *Attorney, Agent, or Firm*—Bacon & Thomas PLLC

(57) ABSTRACT

A toaster-cum-microwave oven includes a toasting chamber, a heating device, a humidity measuring device for measuring an inside humidity of the toasting chamber and producing a humidity signal indicating the measured inside humidity, a switching device for selectively cutting or allowing a power supply to the heating device, and a controlling device. The controlling device receives the humidity signal, calculates a rate of change of humidity using the humidity signal, compares the rate of change of humidity with a predetermined value, and controls the switching device to cut the power supply to the heating device after a remaining cooking time has lapsed if the rate of change of humidity is equal to or greater than the predetermined value.

2 Claims, 5 Drawing Sheets

TOASTER-CUM-MICROWAVE OVEN HAVING A HUMIDITY MEASURING DEVICE

CROSS REFERENCE TO RELATED APPLICATION

This application is a divisional application of U.S. application Ser. No. 10/876,454, filed Jun. 28, 2004 now abandoned (of which the entire disclosure of the pending, prior application is hereby incorporated by reference).

FIELD OF THE INVENTION

The present invention relates to a toaster-cum-microwave oven; and more particularly, to a toaster-cum-microwave oven which is capable of preventing over-toasting of a bread product caused by a residual heat from previous toast batches, toasting it to a user's desired degree.

BACKGROUND OF THE INVENTION

As disclosed in U.S. Pat. No. 6,539,840 entitled "MICROWAVE OVEN HAING A TOASTER" and Japanese Patent No. 3271630 entitled "MICROWAVE OVEN WITH TOASTER", a conventional toaster-cum-microwave (or microwave oven/toaster combination) basically includes a microwave oven section for cooking food in a heating chamber by means of microwave and a toaster section for toasting a bread product in a toasting chamber by means of Joule's heat.

Recently, such conventional toaster-cum-microwave oven is gaining popularity for its versatility and convenience. Since, however, such conventional toaster-cum-microwave oven is kind of an apparatus made by combining a freestanding toaster with a microwave oven, it inherently has the same kind of problem that a freestanding toaster also suffers from. That is, the bread product is over-toasted owing to residual heat left in the toasting chamber from previous toast batches in case the conventional toaster-cum-microwave oven is operated consecutively in a short interval. For example, the conventional toaster-cum-microwave toasts slices of bread as medium, dark and burnt for color selection (or toasting time selection) of light, medium and dark, respectively.

SUMMARY OF THE INVENTION

It is, therefore, an object of the present invention to provide a toaster-cum-microwave oven which is capable of preventing over-toasting of a bread product caused by a residual heat from previous toast batches, toasting it to a user's desired degree.

In accordance with one aspect of the invention, there is provided a toaster-cum-microwave oven, including: a toasting chamber for accommodating a bread product; a heating device which, when energized, supplies heat to the toasting chamber; a temperature measuring device for measuring an inside temperature of the toasting chamber and producing a temperature signal indicating the measured inside temperature; a switching device for selectively cutting or allowing a power supply to the heating device; and a controlling device having a memory, wherein the controlling device receives the temperature signal from the temperature measuring device, determines an amount of heat required to cook the bread product on a basis of data stored in the memory, calculates an amount of heat supplied to the bread product by using the inside temperature of the toasting chamber, compares the supplied amount of heat with the required amount of heat, and controls the switching device to cut the power supply to the heating device if the supplied amount of heat is equal to or greater than the required amount of heat.

In accordance with another aspect of the invention, there is provided with a method for cooking a bread product in a toaster-cum-microwave oven which has a toasting chamber for accommodating the bread product and a heating device which, when energized, supplies heat to the toasting chamber, the method including the steps of: (a) determining an amount of heat required to cook the bread product; (b) measuring a starting inside temperature of the toasting chamber; (c) allowing a power supply to the heating device; (d) measuring an inside temperature of the toasting chamber; (e) calculating an amount of heat supplied to the bread product by using the starting inside temperature and the inside temperature measured at the steps (b) and (d), respectively; (f) comparing the required amount of heat with the supplied amount of heat; and (g) if the supplied amount of heat is equal to or greater than the required amount of heat, cutting the power supply to the heating device.

In accordance with still another aspect of the invention, there is provided with a toaster-cum-microwave oven, including: a toasting chamber for accommodating a bread product; a heating device which, when energized, supplies heat to the toasting chamber; a humidity measuring device for measuring an inside humidity of the toasting chamber and producing a humidity signal indicating the measured inside humidity; a switching device for selectively cutting or allowing a power supply to the heating device; and a controlling device, wherein the controlling device receives the humidity signal, calculates a rate of change of humidity using the humidity signal, compares the rate of change of humidity with a predetermined value, and controls the switching device to cut the power supply to the heating device after a remaining cooking time has lapsed if the rate of change of humidity is equal to or greater than the predetermined value.

In accordance with still another aspect of the invention, there is provided with a method for cooking a bread product in a toaster-cum-microwave oven which has a toasting chamber for accommodating the bread product and a heating device which, when energized, supplies heat to the toasting chamber, the method including the steps of: (a) measuring a starting inside humidity of the toasting chamber; (b) allowing a power supply to the heating device; (c) measuring an inside humidity of the toasting chamber; (d) calculating a rate of change of humidity by using the starting inside humidity and the inside humidity measured at the steps (a) and (c); (e) comparing the rate of change of humidity with a predetermined value; and (f) if the rate of change of humidity is equal to or greater than the predetermined value, cutting the power supply to the heating device after a remaining cooking time has lapsed

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
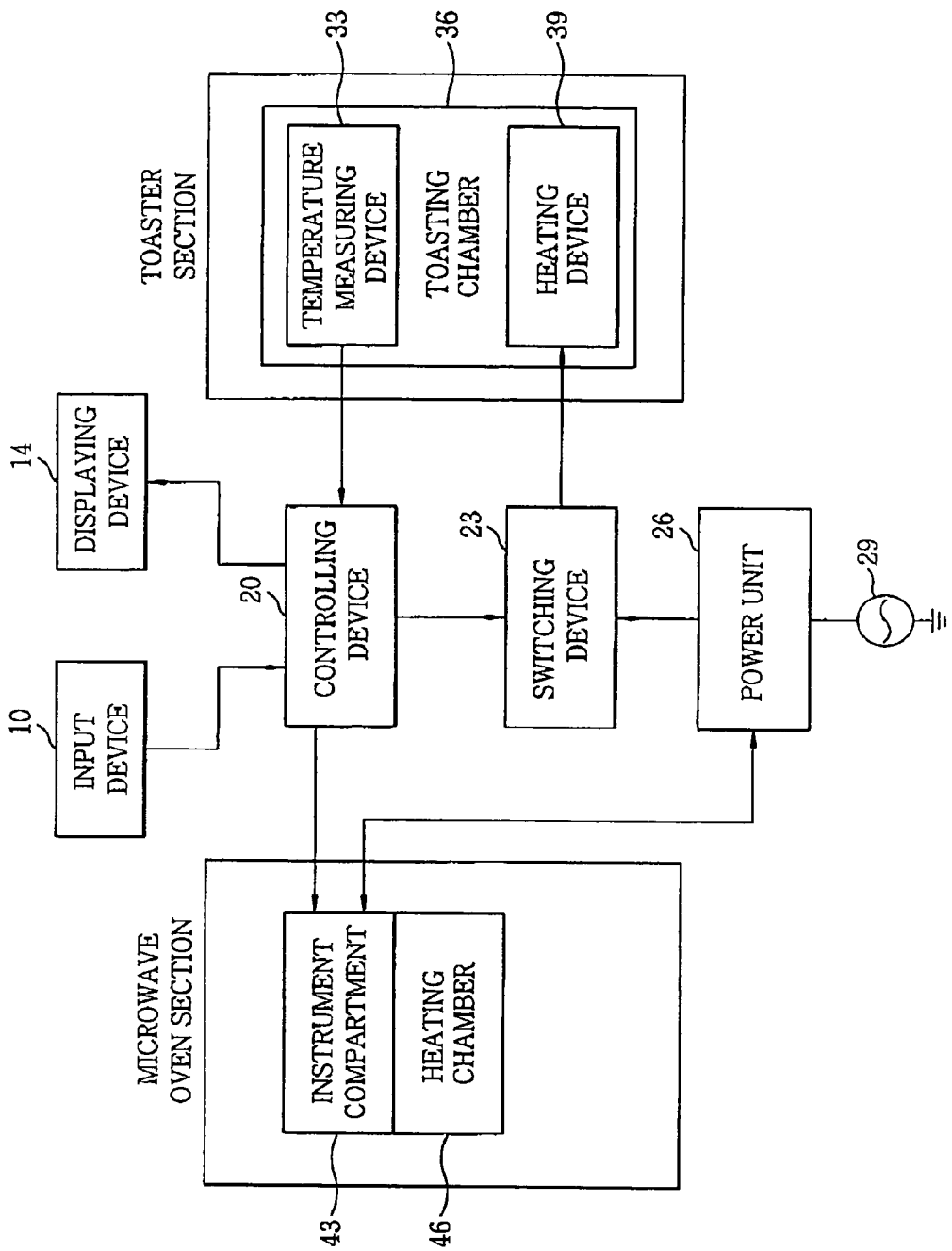
FIG. 1 presents a schematic diagram of a toaster-cum-microwave oven in accordance with a first preferred embodiment of the present invention.

Preferred embodiments of the present invention will now be described in detail with reference to the accompanying drawings, wherein like parts appearing FIGS. 1 to 6 are represented by like reference numerals.

Referring to FIG. 1, there is presented a schematic diagram showing construction of a toaster-cum-microwave oven in accordance with a first preferred embodiment of the present invention. The toaster-cum-microwave oven includes a microwave oven section for heating foodstuff by means of microwave and a toaster section for toasting slices of bread by means of Joule's heat. The microwave oven section is provided with an instrument compartment 43, which has a magnetron (not shown) for generating the microwave, a high-voltage transformer (not shown) for supplying a high voltage to the magnetron, a cooling fan (not shown) for supplying cooling air and the like; and a heating chamber 46 in which the foodstuff is heated by means of the microwave. The toaster section is provided with a toasting chamber 36 for accommodating the slices of bread; a heating device 39 which, when energized, supplies heat to the toasting chamber 36; and a temperature measuring device 33 which measures an inside temperature of the toasting chamber 36 and generates a temperature signal indicating the measured temperature.

Further, the toaster-cum-microwave oven includes an input device 10 which receives a user's selection wherein the user's selection represents which section is selected among the microwave oven section and the toaster section and/or a degree of browning of the slice of bread, and produces a selection signal indicating such selection; and a controlling device 20 which receives the temperature and the selection signal from the temperature measuring device 33 and the input device 10, respectively, and, according to these signals, controls a switching device 23 which selectively cuts or allows a power supply to the instrument compartment 43 of the microwave oven section and the heating device 39 of the toaster section. A displaying device 14 shows signals from the controlling device 20 to users in a readable form, and a power unit 26 receives operation power, i.e., a.c. power from a conventional a.c. service 29, and supplies the operating power to the instrument compartment 43 and the heating device 39 through the switching device 23, e.g., relay.

Figure 2:
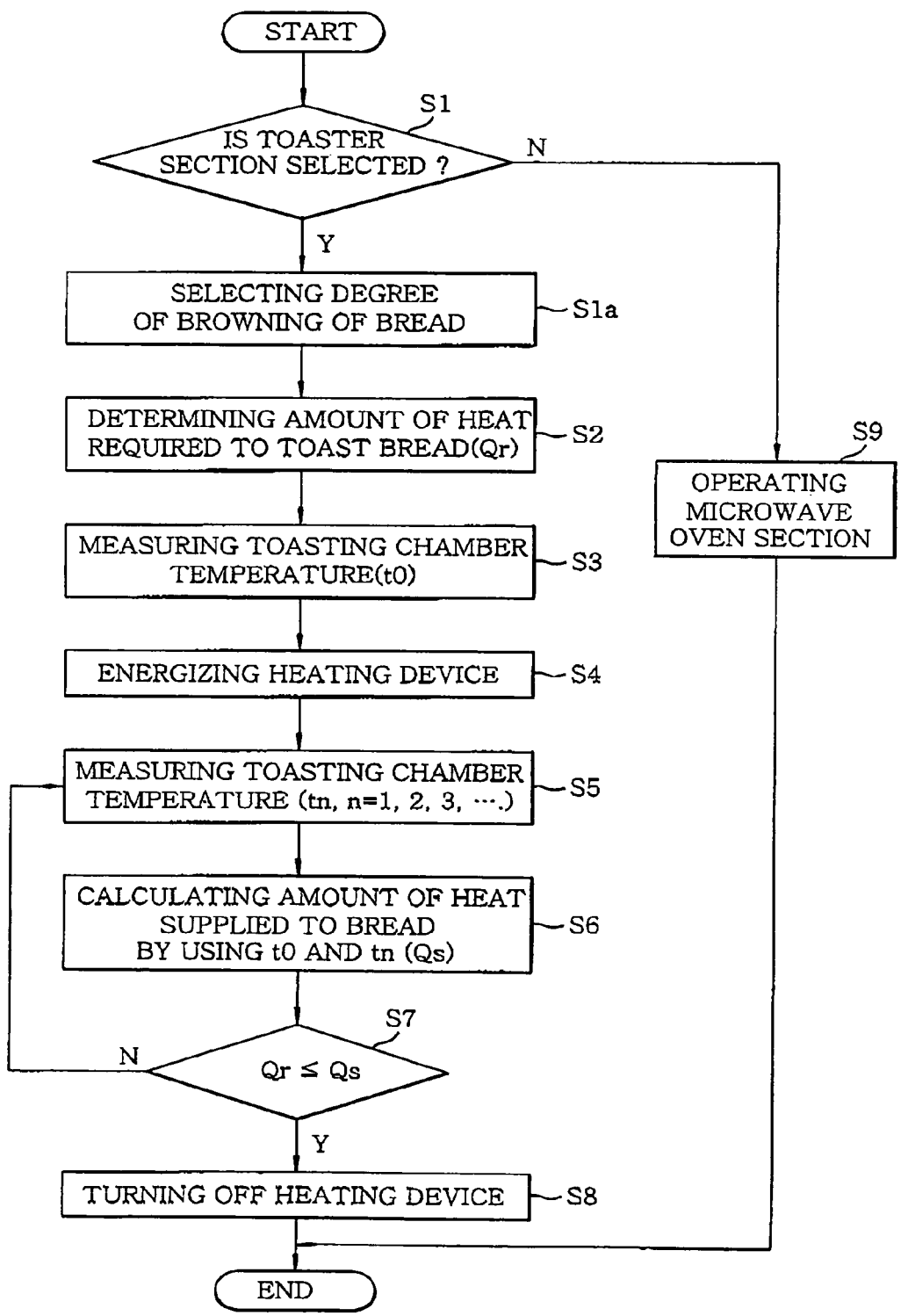
FIG. 2 is a flowchart for showing an operation of a controller of the toaster-cum-microwave of FIG. 1.

Referring to FIG. 2, there is illustrated a flowchart for showing an operation of the controlling device 20 of the toaster-cum-microwave of FIG. 1. After the toaster-cum-microwave is activated, the controlling device 20 determines, at step S1, which section among the microwave oven section and the toaster section is selected on the basis of the selection signal from the input device 10. If the microwave oven section is selected, the controlling device 20 makes the microwave oven section activated. The operation of the microwave oven section is not a subject matter of the present invention, and so the description therefor is omitted. If the toaster section is selected, the controlling device 20 receives, at step S1a, signals as to the degree of browning of bread (e.g., light, medium or dark color) through the input device 10 and determines, at step S2, an amount of heat Qr required for toasting the bread. The determination of the amount of heat Qr is conducted by using data previously stored in a memory (not shown) of the controlling device 20. Further, the user can input to the controlling device 20 through the input device 10 more specific information about a bead product to be cooked, such as, the number of slices of bread, bread type or thickness, and the controlling device 20 can use such information in determining the required amount of heat Qr.

Next, the controlling device 10 receives, at step S3, the temperature signal indicating a starting inside temperature t0 of the toasting chamber 36 from the temperature measuring device 33, and operates, at step S4, the switching device 26 to supply a power supply to the heating device 39. Then, the controlling device 10 receives, at step S5, the temperature signal indicating an inside temperature tn (n=1, 2, 3, . . . ) of the toasting chamber in a predetermined interval, e.g., 2 seconds, and calculates, at step S6, an amount of heat supplied to the slice of bread in the toasting chamber 36 by using t0 and $t_n$. Next, at step S7, the controlling device 20 compares the required amount of heat Qr with the supplied amount of heat Qs. If the supplied amount of heat Qs is less than the required amount of heat Qr, the steps S5 and S6 are repeated. Meanwhile, if the supplied amount of heat Qs is equal to or greater than the required amount of heat Qr, the controlling device 20 operates, at step S8, the switching device 23 to cut the power supply to the heating device 39 so that the heating device 39 turns off.

As described above, since the toaster-cum-microwave in accordance with the first preferred embodiment of the present invention compares the amount of heat required for toasting, which is determined on the basis of information input into the controlling device through the inputted device prior to the toasting, with the amount of heat supplied to the slice of bread in the toasting chamber, which is calculated in the course of the toasting by using the inside temperature of the toasting chamber 36, and then operates the switching device to cut the power supply to the heating device 39 if the supplied amount of heat is equal to or greater than the required amount of heat. Therefore, the bread product can be cooked or toasted to the user's desired degree.

Further, since the toaster-cum-microwave in accordance with the first preferred embodiment determines the ending time of the toasting by using the required amount of heat Qr and the supplied amount of heat Qs, it does not suffer from a problem that the slices of bread are toasted improperly owing to voltage deviation of domestic electricity supply.

Hereinafter, a toaster-cum-microwave oven in accordance with a second preferred embodiment of the present invention will now be described in detail, wherein like parts to those of the first preferred embodiment are referred to by like reference characters and the description therefor will not be repeated for simplicity.

Figure 3:
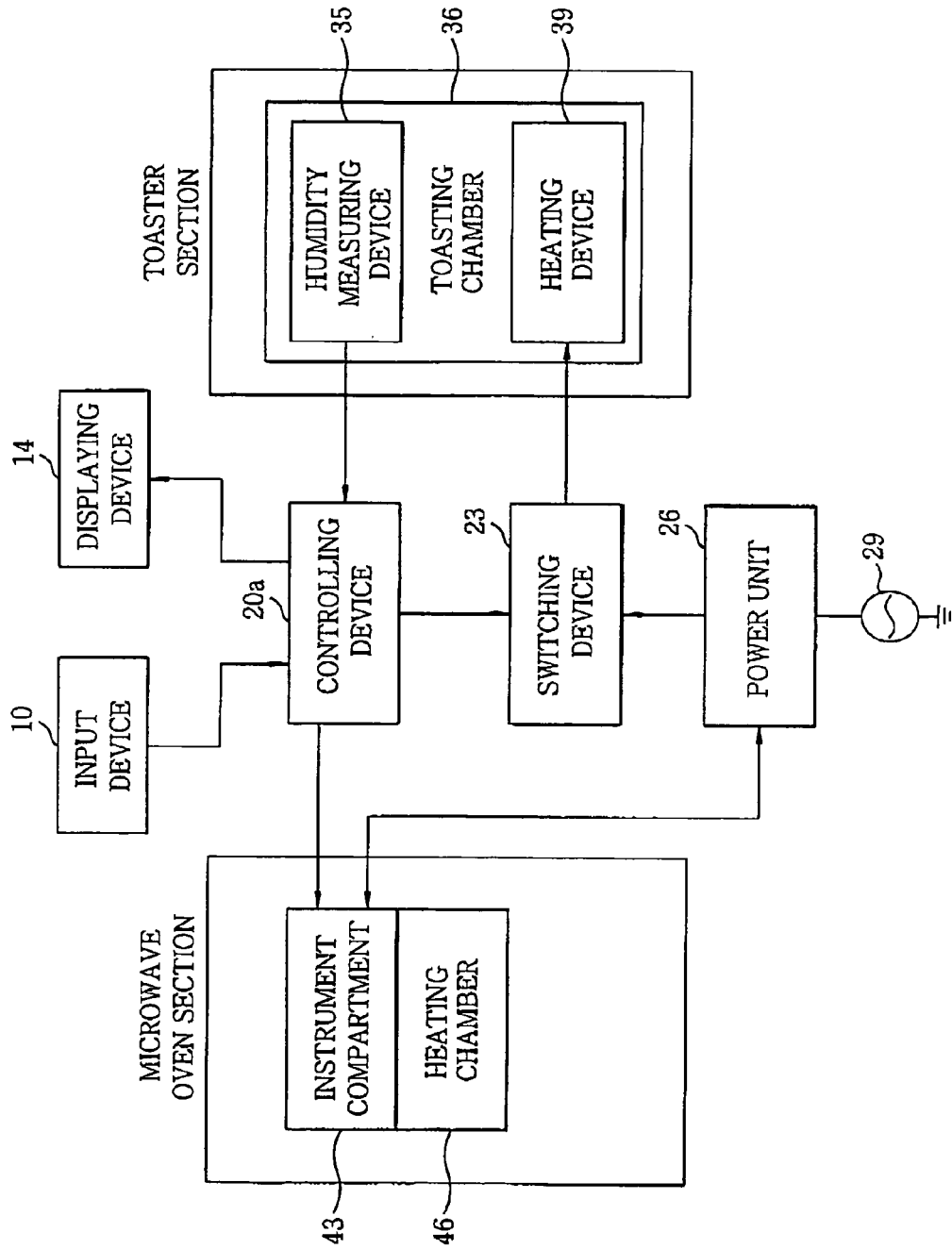
FIG. 3 depicts a schematic diagram of the toaster-cum-microwave in accordance with the second preferred embodiment of the present invention.

Referring to FIG. 3, there is illustrated a schematic diagram of the toaster-cum-microwave in accordance with the second preferred embodiment of the present invention. The toaster-cum-microwave of the second preferred embodiment includes a humidity measuring device 35 for measuring an inside humidity of the toasting chamber 36 instead of the temperature measuring device 33 for measuring the inside temperature of the toasting chamber 36. The humidity measuring device 35 measures the inside humidity of the toasting chamber 36 and produces a humidity signal indicating the measured inside humidity of the toasting chamber 36. Electrically connected to the humidity measuring device 35 is a controlling device 20a, which receives the humidity signal therefrom. In addition, the controlling device 20a receives a selection signal from the input device 10, which indicate a user's selection for representing which section 13 selected among the microwave section and the toaster section and/or the selection for the degree of browning of bread.

Figure 4:
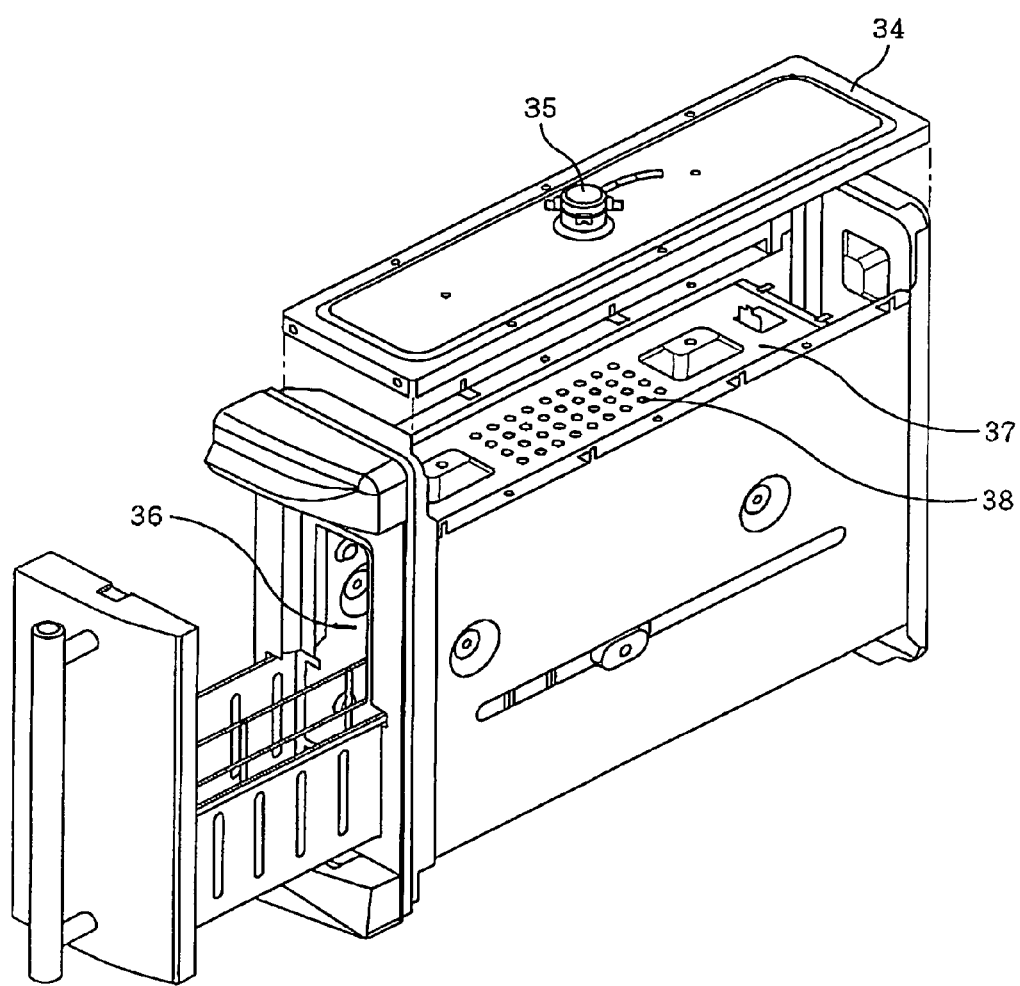
FIG. 4 offers an exploded perspective view of a toaster section of FIG. 3.

Referring to FIG. 4, there is presented an exploded perspective view of the toaster section of FIG. 3. Disposed at an upper portion of the toasting chamber 36 is an upper plate 37 having a plurality of air openings 38. Disposed above the upper plate 37 is a cover plate 34, at which the humidity measuring device 35 is installed. The plurality of air openings 38 are formed in the upper plate 37 in such a manner that humidity forming in the course of toasting the slices of bread rises upward uniformly. A probe section (not shown) of the humidity measuring device 35 is disposed on a lower surface of the cover plate 34 and measures humidity contained in air rising upward through the plurality of air openings 38.

Further, the humidity forming in the course of toasting the slices of bread is exhausted to outside of the toast-cum-microwave oven via the heating chamber 46 of the microwave oven section, louvers formed in an outer casing (not shown) and the like. In addition, when the toasting chamber 36 is opened for retrieval of the slices of bread, most of the humidity in the toasting chamber 36 is exhausted therefrom.

Figure 5:
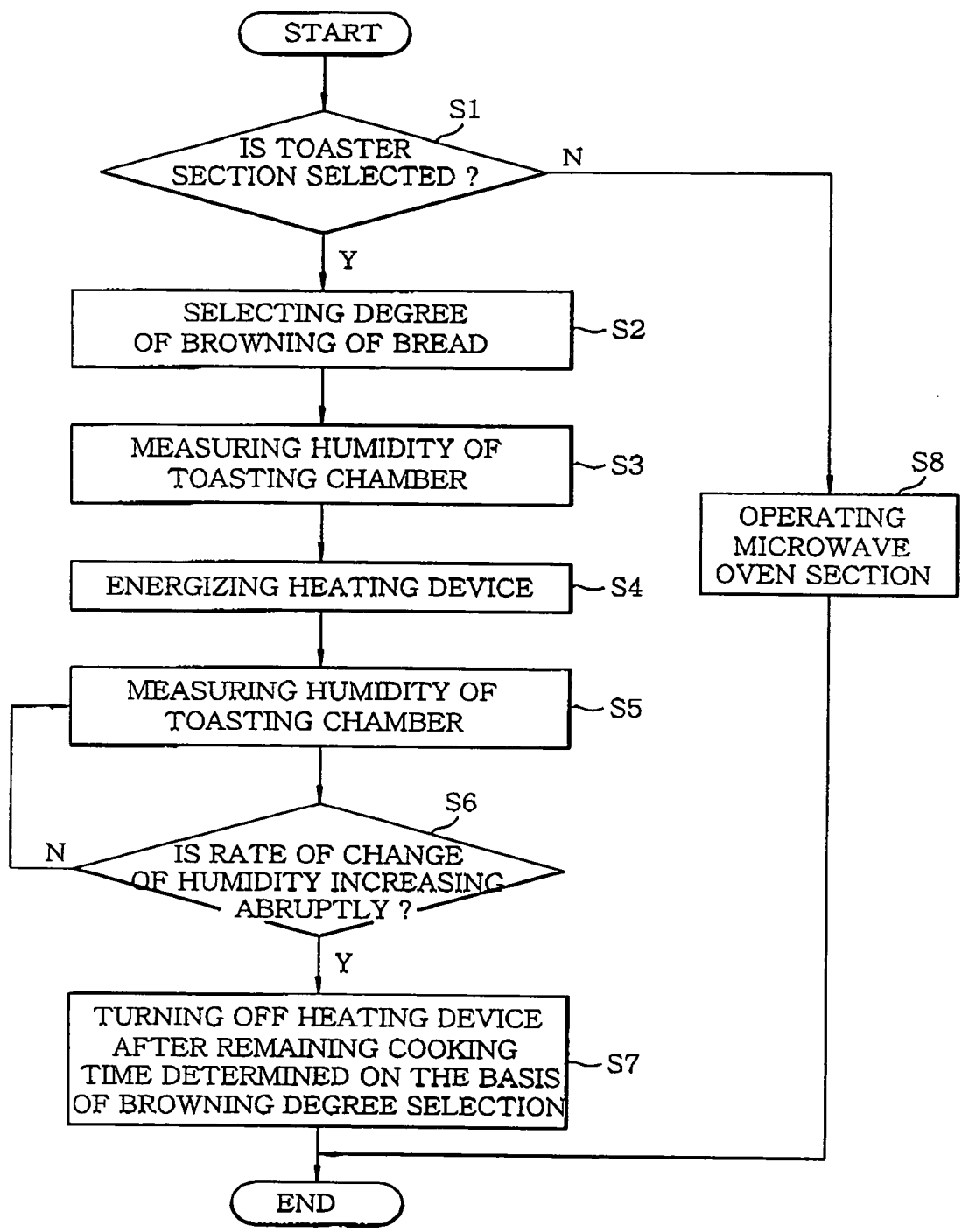
FIG. 5 sets forth a flowchart for showing an operation of a controlling device of the toaster-cum-microwave of FIG. 3.

Referring to FIG. 5, there is shown a flowchart for showing an operation of the controlling device 20a of the toaster-cum-microwave of FIG. 3. At step S1, the controlling device 20a determines whether the microwave oven section or the toaster section is selected on the basis of the selection signal from the input device 10. If the microwave oven section is selected, the controlling device 20a transmits a proper control signal to the instrument compartment 43 to operate the microwave oven section. Meanwhile, if the toaster section is selected, the controlling device 20a receives the selection signal for the degree of browning of bread from the input device 10 at step S2. The controlling device 20a receives, at step S3, a starting humidity signal of the toasting chamber 36 from the humidity measuring device 35, and controls, at step S4, the switching device 23 to allow the power supply to the heating device 39. Next, at step S5, the controlling device 20a receives a humidity signal of the toasting chamber 36. Then, at step S6, the controlling device 20a calculates the rate of change of humidity and determines whether the rate of change of humidity varies abruptly or not, i.e., the controlling device 20a compares the rate of change of humidity with the predetermined value. If the rate of change of humidity is equal to or greater than the predetermined value, the controlling device 20a determines, at step S7, the remaining cooking time on the basis of the selection signal for the degree of browning of bread inputted thereinto at the step S2, and controls the switching device 23 to cut the power supply to the heating device 39 after the remaining cooking time has lapsed. For example, if the selection for the degree of browning of bread is light, medium or dark, the remaining cooking time is set 10 seconds, 30 seconds or 1 minute. Further, the user can input to the controller 20 through the input device 10 more specific information about the slices of bread to be cooked or toasted, such as, the number of slices of bread, bread type or thickness, and the controlling device 20 can use such information in determining the remaining cooking time. Meanwhile, if the rate of change of humidity is less than the predetermined value, the controlling device 20a repeats the steps S5, S6.

As described above, the remaining cooking time is determined at the moment when the rate of change of humidity varies abruptly, i.e., the moment when the color of the slices of bread in the toasting chamber 36 is turned to brown. After this moment, the residual heat left in the toasting chamber from previous toast batches seldom affects on toasting conditions, such as, the inside temperature of the toasting chamber. Therefore, the toaster-cum-microwave in accordance with the second preferred embodiment is capable of toasting the slices of bread to the user's desired degree, and preventing over-toasting thereof frequently occurring owing to the residual heat when the conventional toaster-cum-microwave is operated consecutively in a short interval.

Further, it should be noted that the concept of the present invention can be applied to a typical stand-alone toaster (or a freestanding toaster).

While the invention has been shown and described with respect to the preferred embodiments, it will be understood by those skilled in the art that various changes and modifications may be made without departing from the spirit and scope of the invention as defined in the following claims.

What is claimed is:

1. A toaster-cum-microwave oven, comprising:
a toasting chamber for accommodating a bread product, the toasting chamber including an upper plate in which a plurality of openings are formed and a cover plate disposed above the upper plate;
a heating device which, when energized, supplies heat to the toasting chamber;
a humidity measuring device, installed in the cover plate, for measuring an inside humidity of the toasting chamber and producing a humidity signal indicating the measured inside humidity;
a switching device for selectively cutting or allowing a power supply to the heating device;
a controlling device; and
an input device for receiving a user's selection for a degree of browning of the bread product and producing a selection signal indicating the user's selection for the degree of browning of the bread product,
wherein the controlling device receives the humidity signal, calculates a rate of change of humidity using the humidity signal, compares the rate of change of humidity with a predetermined value, controls the switching device to cut the power supply to the heating device after a remaining cooking time has lapsed if the rate of change of humidity is equal to or greater than the predetermined value, and receives and uses the selection signal in determining the remaining cooking time.

2. A method for cooking a bread product in a toaster-cum-microwave oven which has a toasting chamber for accommodating the bread product and a heating device which, when energized, supplies heat to the toasting chamber, the method comprising the steps of:
(a) selecting a degree of browning of the bread product, wherein a remaining cooking time is determined by using the selected degree of browning of the bread product;
(b) measuring a starting inside humidity of the toasting chamber;
(c) allowing a power supply to the heating device;
(d) measuring an inside humidity of the toasting chamber;

(e) calculating a rate of change of humidity by using the starting inside humidity and the inside humidity measured at the steps (b) and (d);

(f) comparing the rate of change of humidity with a predetermined value; and (g) if the rate of change of humidity is equal to or greater than the predetermined value, cutting the power supply to the heating device after the remaining cooking time has lapsed.

* * * * *